US00RE47878E

(19) United States
(12) Reissued Patent
Beale

(10) Patent Number: US RE47,878 E
(45) Date of Reissued Patent: *Feb. 25, 2020

(54) OBTAINING CHANNEL QUALITY INFORMATION IN A WIRELESS COMMUNICATION NETWORK

(71) Applicant: Sony Corporation, Tokyo (JP)

(72) Inventor: Martin Warwick Beale, Bristol (GB)

(73) Assignee: Sony Corporation, Tokyo (JP)

( * ) Notice: This patent is subject to a terminal disclaimer.

(21) Appl. No.: 14/093,327

(22) Filed: Nov. 29, 2013

Related U.S. Patent Documents

Reissue of:
(64) Patent No.: 7,539,497
Issued: May 26, 2009
Appl. No.: 10/922,584
Filed: Aug. 19, 2004

U.S. Applications:
(63) Continuation of application No. 13/116,845, filed on May 26, 2011, now Pat. No. Re. 44,662, which is an application for the reissue of Pat. No. 7,539,497.

(30) Foreign Application Priority Data

Aug. 20, 2003 (GB) ..... 0319567.4

(51) Int. Cl.
*H04W 72/00* (2009.01)
*H04J 3/16* (2006.01)
(Continued)

(52) U.S. Cl.
CPC ..... *H04W 24/06* (2013.01); *H04W 92/10* (2013.01)

(58) Field of Classification Search
CPC .. H04W 14/06; H04W 72/0413; H04W 92/10
(Continued)

(56) References Cited

U.S. PATENT DOCUMENTS 6,181,686 B1 1/2001 Hamalainen et al.
6,606,629 B1 * 8/2003 DeKoning et al.
(Continued)

FOREIGN PATENT DOCUMENTS

EP 1304900 4/2003
EP 1487144 A1 * 12/2004
(Continued)

OTHER PUBLICATIONS

Design and Performance of Down Link Shared Control Channel for HSDPA Amah Das, Farooq Khan, Ashwin Sampath and HsuanJung Su, IEEE 2002.*

(Continued)

*Primary Examiner* — Fred O Ferris, III
(74) *Attorney, Agent, or Firm* — Xsensus LLP

(57) ABSTRACT

Obtaining channel quality information in a wireless communication network is described. A base station allocates a resource to remote stations in order to receive channel quality information back from remote stations. The resource allocated to a remote station contains no higher layer data. A scheduler in the base station uses the channel quality information in order to schedule remote stations and/or to decide on the channel coding and/or modulation to be applied to the data transmission. A mechanism is provided to ensure that data transmitted on HS-DSCH is not transmitted to higher layers. This may provide a convenient method of obtaining channel quality information allowing for improved scheduling and thus improved performance of the communication system.

51 Claims, 10 Drawing Sheets

(51) Int. Cl.
*H04W 24/06* (2009.01)
*H04W 92/10* (2009.01)

(58) Field of Classification Search
USPC ..... 370/329, 469; 455/450, 451
See application file for complete search history.

(56) References Cited

U.S. PATENT DOCUMENTS

| | | | | |
|---|---|---|---|---|
| 7,310,499 | B2 * | 12/2007 | Magnusson et al. | 455/69 |
| 7,412,212 | B2 * | 8/2008 | Hottinen | 455/101 |
| 7,426,176 | B2 | 9/2008 | Liu et al. | |
| 7,657,815 | B2 * | 2/2010 | Seidel | H04L 1/1845 370/229 |
| 7,885,662 | B2 * | 2/2011 | Lindoff et al. | 455/450 |
| 7,965,646 | B2 * | 6/2011 | Casey | 370/241.1 |
| 8,018,902 | B2 * | 9/2011 | Wintzell | 370/332 |
| 8,018,930 | B2 * | 9/2011 | Casaccia et al. | 370/389 |
| 8,364,160 | B2 * | 1/2013 | Usuda et al. | 455/452.2 |
| 8,374,190 | B2 * | 2/2013 | Rudolf et al. | 370/442 |
| 8,463,313 | B2 * | 6/2013 | Love et al. | 455/522 |
| 8,588,802 | B2 * | 11/2013 | Usuda et al. | 455/452.2 |
| 2001/0043572 | A1 * | 11/2001 | Bilgic et al. | 370/281 |
| 2002/0170013 | A1 * | 11/2002 | Bolourchi et al. | 714/758 |
| 2003/0039270 | A1 * | 2/2003 | Chang et al. | 370/469 |
| 2003/0108025 | A1 | 6/2003 | Kim et al. | |
| 2003/0118031 | A1 | 6/2003 | Classon et al. | |
| 2004/0022213 | A1 | 2/2004 | Choi et al. | |
| 2004/0052250 | A1 * | 3/2004 | Hu et al. | 370/389 |
| 2004/0066754 | A1 * | 4/2004 | Hottinen | 370/252 |
| 2004/0081181 | A1 * | 4/2004 | Malkamaki | 370/410 |
| 2004/0109433 | A1 * | 6/2004 | Khan | H04L 1/1614 370/345 |
| 2004/0142698 | A1 * | 7/2004 | Pietraski | 455/452.2 |
| 2004/0198369 | A1 * | 10/2004 | Kwak et al. | 455/452.2 |
| 2004/0215753 | A1 | 10/2004 | Chan et al. | |
| 2005/0003782 | A1 * | 1/2005 | Wintzell | 455/226.3 |
| 2005/0009527 | A1 * | 1/2005 | Sharma | 455/445 |
| 2005/0018656 | A1 * | 1/2005 | Rudolf et al. | 370/352 |
| 2005/0181799 | A1 | 8/2005 | Laroia et al. | |
| 2005/0191965 | A1 * | 9/2005 | Yu et al. | 455/67.16 |
| 2005/0201325 | A1 * | 9/2005 | Kang et al. | 370/328 |
| 2005/0233754 | A1 * | 10/2005 | Beale | 455/452.2 |
| 2006/0034196 | A1 * | 2/2006 | Casey | 370/278 |
| 2006/0068825 | A1 * | 3/2006 | Iochi | 455/522 |
| 2006/0077923 | A1 * | 4/2006 | Niwano | 370/328 |
| 2006/0221923 | A1 * | 10/2006 | Usuda et al. | 370/338 |
| 2006/0223543 | A1 * | 10/2006 | Usuda et al. | 455/450 |
| 2006/0256732 | A1 * | 11/2006 | Hamalainen | 370/252 |
| 2006/0258364 | A1 * | 11/2006 | Usuda et al. | 455/450 |
| 2007/0041429 | A1 * | 2/2007 | Khandekar | 375/146 |
| 2008/0062932 | A1 * | 3/2008 | Hwang | 370/331 |
| 2008/0090579 | A1 * | 4/2008 | Usuda et al. | 455/450 |
| 2008/0164996 | A1 * | 7/2008 | Coronel et al. | 340/539.1 |
| 2008/0261606 | A1 * | 10/2008 | Usuda et al. | 455/450 |
| 2008/0280567 | A1 * | 11/2008 | Sharma | 455/73 |
| 2009/0036139 | A1 * | 2/2009 | Usuda et al. | 455/450 |
| 2010/0095183 | A1 * | 4/2010 | Petrovic et al. | 714/748 |
| 2010/0136987 | A1 * | 6/2010 | Kim et al. | 455/450 |
| 2011/0007653 | A1 * | 1/2011 | Casaccia et al. | 370/252 |
| 2011/0223957 | A1 * | 9/2011 | Pietraski | 455/514 |
| 2011/0305218 | A1 * | 12/2011 | Yoon et al. | 370/329 |
| 2013/0223316 | A1 * | 8/2013 | Rudolf et al. | 370/311 |
| 2014/0219221 | A1 * | 8/2014 | Dick et al. | 370/329 |

FOREIGN PATENT DOCUMENTS

| | | |
|---|---|---|
| GB | 0319567 | 9/2003 |
| WO | WO-99/40699 A1 | 8/1999 |

OTHER PUBLICATIONS

High Speed Downlink Packet Access: WCDMA Evolution Troels Emil Kolding, Klaus Ingemann Pedersen, Jeroen Wigard, Frank Frederiksen & Preben Elgaard Mogensen, Nokia Networks, IEEE 2003.*

Adaptive, Asynchronous Incremental Redundancy (A%) With Fixed Transmission Time Intervals (TTI) for HSDPA Arnab Das, Farooq Khan, Ashwin Sampath and Hsuan-Jung Su, IEEE 2002.*

3G Evolution Towards High Speed Downlink Packet Access; B. Haberland, S. Bloch, V. Braun 4th Quarter Jan. 2003.*

A Novel Technique for High Speed Uplink Data Transmission in 3G Systems F. Khan IEEE 2003.*

European Examination Report dated Nov. 16, 2006, for European Application No. 04764250.9 filed Aug. 18, 2002, 7 pages.

"3rd Generation Partnership Project; Technical Specification Group Services and System Aspects; General Packet Radio Service (GPRS); Service description; Stage 2," Release 1999 (06-3002), 3GPP TS 23.060 v3.12.0, 3GPP, p. 1-192.

Search Report dated Jan. 8, 2004, for GB Application No. GB 0319567.4, dated Aug. 20, 2003, three pages.

International Search Report dated Jan. 24, 2005, for PCT Application No. PCT/EP2004/009264, filed on Aug. 18, 2004, four pages.

Korean Office Action dated Sep. 15, 2011, in Patent Application No. 10-2011-7011041. (English Translation only).

"3rd Generation Partnership Project; Technical Specification Group Radio Access Network; UTRAN Overall Description," (Oct. 1999). 3G TS 25.401 v3.0.0, 3GPP, p. 1-33.

Mitsubishi Electric (2003). "Tdoc R1-030254: Evaluation of CQI feedback schemes," 3GPP TSG RAN WG1#31, Feb. 18-21, 2003, Tokyo, Japan, p. 1-7.

Lucent Technologies, Mitsubishi, Philips, Siemens (2003). "Tdoc R1-03-0286: Text proposal on CQI Enhancements for TR on HSDPA Enhancements," 3GPP TSG RAN WG1#31, Feb. 18-21, 2003, Tokyo, Japan, p. 1-8.

International Written Opinion dated Feb. 20, 2006, for PCT Application No. PCT/EP2004/009264 filed Aug. 18, 2004, 10 pages.

* cited by examiner

OBTAINING CHANNEL QUALITY INFORMATION IN A WIRELESS COMMUNICATION NETWORK

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application *is a continuation reissue application of U.S. Reissue application Ser. No. 13/116,845, filed May 26, 2011* (*now U.S. Pat. No. RE44,662*), *which in turn is a reissue application of U.S. Pat. No. 7,539,497, which corresponds to U.S. patent application Ser. No. 10/922,584, filed Aug. 19, 2004, which* claims the benefit of United Kingdom patent application number 0319567.4, filed Aug. 20, 2003, *the contents of each of* which is incorporated by reference in its entirety herein.

FIELD OF THE INVENTION

This invention relates to code division multiple access (CDMA) systems, and particularly (though not exclusively) to wireless CDMA systems such as 3$^{rd}$ Generation Partnership Project (3GPP) systems utilising packet data services and employing High Speed Downlink Packet Access (HSDPA).

BACKGROUND OF THE INVENTION

There has been a growth in demand for packet switched wireless data services due to the growth in internet applications. A typical channel over which these data services are delivered is a radio channel. There are available radio channels in an increasing number of frequency bands. A frequency band of particular interest is the IMT-2000 frequency band (at a frequency of about 2 GHz). This frequency band is used for delivery of data services using wideband code division multiple access (WCDMA) techniques. Two WCDMA techniques that may be used in this frequency band are frequency division duplex (FDD) techniques and time division duplex (TDD) techniques.

A well known feature of radio channels is multipath propagation. Radio waves from a transmitter may take several paths simultaneously to a receiver: these multiple paths are possible due to the radio waves reflecting off various objects in the surroundings. The objects that cause these reflections can either be stationary or mobile (for example, the radio waves may reflect off moving vehicles). Indeed the receiver may be either stationary or mobile. These radio waves combine at the receiver (by the laws of superposition). The combination can be either constructive or destructive. Destructive combination leads to a smaller signal at the receiver whereas constructive combination leads to a larger signal at the receiver.

When either the receiver moves or the surroundings of the receiver move, the receiver will progressively enter zones of constructive and destructive interference. In such a way, the signal strength at the receiver will fade up and down. This fading can be a problem for transmission of mobile data.

There are various strategies for overcoming the problems of fading. It is possible to employ forward error correction to correct errors that occur during a fade. Generally forward error correction requires the errors to be uniformly distributed. This can be achieved using interleaving. The depth of the interleaver is a function of the channel: for fast channels, a small interleaving depth may be employed, for slow channels, a larger interleaving depth is required. For slow channels, the latency associated with a large interleaving depth prohibits its use.

It is possible for the transmitter to base it's transmit power assuming a worst case fade depth. This strategy is wasteful of transmit power.

A strategy that is useful when packet data services are transmitted across a fading radio channel is to exploit multi-user diversity. Multi-user diversity may be employed when there are multiple users that are all requesting service concurrently. If the transmitter knows the channel conditions that are being experienced by the receivers that it is serving, it may schedule those users that are experiencing favourable channel conditions in preference to those experiencing unfavourable channel conditions. Furthermore, the scheduler may wish to use less error correcting coding or transmit using a higher order modulation when transmitting to users with the best channel conditions (such techniques will increase the instantaneous throughput to those users).

In the HSDPA system that is specified by 3GPP, the transmitter is the Node B (a "base station") and the receiver is the UE (user equipment, i.e., a "remote station"). The HSDPA system that is specified by 3GPP exploits multi-user diversity in several ways:

- the amount of error correcting coding and modulation applied may be varied between transmissions (adaptive modulation and coding: AMC).
- the scheduling function is located in the Node B: this network element has a shorter round trip delay to the UE than the RNC (Radio Network Controller) which is where the scheduling function is classically located. The Node B may attempt to always choose users to schedule that are experiencing favourable channel conditions.
- the UE reports channel quality directly to the Node B, allowing the Node B to make scheduling decisions based on channel quality.

3GPP have specified HSDPA both for the FDD (Frequency Division Duplex) and for the TDD (Time Division Duplex) modes. In both modes of operation, there is a mechanism by which channel quality estimates are fed back from the UE to the Node B.

In FDD, a dedicated channel exists that runs continuously in the uplink and the downlink. The UE makes measurements on the downlink channel and reports these measurements continuously in the uplink (where the reporting period is specified by the network). This system has the advantage that the Node B is continuously updated with channel quality information from the UE. The disadvantage with this system is that these dedicated channels need to be maintained: these dedicated channels consume scarce power and code resources.

In TDD, there is no requirement for a dedicated channel (in the sense that any dedicated channel that is maintained by the network serves no purpose in the functioning of HSDPA and may be configured to consume an insignificant amount of physical resources in any case). When data-bearing resources (HS-DSCH: High Speed Downlink Shared Channel) are allocated in TDD HSDPA, a shared uplink channel (HS-SICH: High Speed Shared Information Channel) is automatically allocated. This uplink channel carries an acknowledgement of the HS-DSCH and a channel quality indication. The advantage of this system is that a resource-consuming dedicated channel does not need to be maintained. The disadvantage is that channel quality information is received by the scheduler in the Node B only infrequently.

The TDD method of channel quality information reporting can work well with certain traffic models and allocation strategies. Namely, when a streaming traffic model is used, each UE will be continually allocated with a resource (and the Node B will continually receive channel quality reports). However, a streaming traffic model is not ideally suited to exploitation of multi-user diversity (since a minimum "drip-feed" of allocation is required in order to maintain the stream).

A strategy that could be adopted by the Node B to gain channel quality information is for the Node B to explicitly request a channel quality report from the UE. This channel quality request message may be small and thus have an insignificant impact on overall system throughput. The Node B may use the returned channel quality reports to gain multi-user diversity benefits by employing adaptive modulation and coding, fast scheduling and other techniques previously referred to.

Methods for explicitly requesting channel quality information reports from the UE have been proposed. However, these methods of requesting channel quality information require amendments to the 3GPP standards and do not propose how these channel quality information requests would be scheduled by the Node B or how the UE would derive the channel quality information that is to be returned to the UE.

A need therefore exists for HSDPA communication wherein the abovementioned disadvantage(s) may be alleviated.

SUMMARY OF THE INVENTION

In accordance with a first aspect of the present invention there is provided a method for HSDPA communication.

In accordance with a second aspect of the present invention there is provided a base station for HSDPA communication.

In accordance with a third aspect of the present invention there is provided a remote station for HSDPA communication.

In accordance with a fourth aspect of the present invention there is provided a system for HSDPA communication.

In accordance with a fifth aspect of the present invention there is provided a method for determining channel propagation information.

In accordance with a sixth aspect of the present invention there is provided an apparatus for determining channel propagation information.

BRIEF DESCRIPTION OF THE DRAWINGS

One method, system, base station and remote station for HSDPA scheduling in a communication system incorporating embodiments of the present invention will now be described, by way of example only, with reference to the accompanying drawing(s), in which.

DETAILED DESCRIPTION OF EMBODIMENTS OF THE INVENTION

Figure 1:
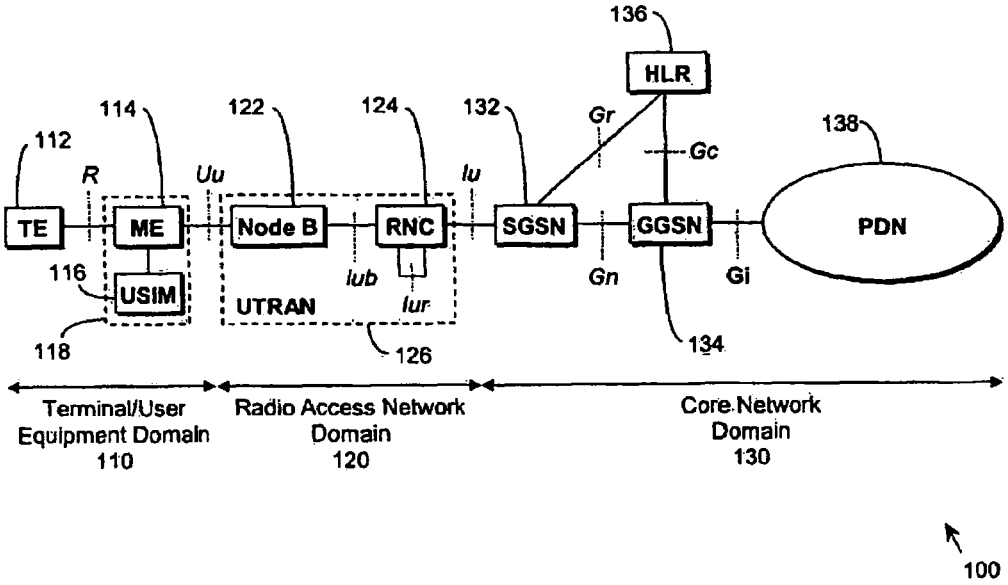
FIG. 1 shows a block schematic diagram illustrating a 3GPP radio communication system in which an embodiment of the present invention may be used.

Referring firstly to FIG. 1, a typical, standard UMTS Radio Access Network (UTRAN) system 100 is conveniently considered as comprising: a terminal/user equipment domain 110; a UMTS Terrestrial Radio Access Network domain 120; and an infrastructure domain 130.

In the terminal/user equipment domain 110, terminal equipment (TE) 112 is connected to mobile equipment (ME) 114 via the wired or wireless R interface. The ME 114 is also connected to a user service identity module (USIM) 116; the ME 114 and the USIM 116 together are considered as a user equipment (UE) 118. The UE 118 communicates data with a Node B (base station) 122 in the radio access network domain (120) via the wireless Uu interface. Within the radio access network domain 120, the Node B 122 communicates with a radio network controller (RNC) 124 via the Iub interface. The RNC 124 communicates with other RNC's (not shown) via the Iur interface. The Node B 122 and the RNC 124 together form the UTRAN 126. The RNC 124 communicates with a serving GPRS service node (SGSN) 132 in the core network domain 130 via the Iu interface. Within the core network domain 130, the SGSN 132 communicates with a gateway GPRS support node 134 via the Gn interface; the SGSN 132 and the GGSN 134 communicate with a home location register (HLR) server 136 via the Gr interface and the Gc interface respectively. The GGSN 134 communicates with public data network 138 via the Gi interface.

Thus, the elements RNC 124, SGSN 132 and GGSN 134 are conventionally provided as discrete and separate units (on their own respective software/hardware platforms) divided across the radio access network domain (120) and the core network domain (130), as shown FIG. 1.

The RNC 124 is the UTRAN element responsible for the control and allocation of resources for numerous Node B's 122; typically 50 to 100 Node B's may be controlled by one RNC. The RNC also provides reliable delivery of user traffic over the air interfaces. RNC's communicate with each other (via the Iur interface).

The SGSN 132 is the UMTS Core Network element responsible for Session Control and interface to the HLR. The SGSN keeps track of the location of an individual UE and performs security functions and access control. The SGSN is a large centralised controller for many RNCs.

The GGSN 134 is the UMTS Core Network element responsible for concentrating and tunnelling user data within the core packet network to the ultimate destination (e.g., internet service provider—ISP).

Such a UTRAN system and its operation are described more fully in the 3rd Generation Partnership Project technical specification documents 3GPP TS 25.401, 3GPP TS 23.060, and related documents (all incorporated by reference herein), available from the 3GPP web site at www.3gpp.org, and need not be described herein in more detail.

A strategy that is useful when packet data services are transmitted across a fading radio channel is to exploit multi-user diversity. Multi-user diversity may be employed when there are multiple users that are all requesting service concurrently. If the transmitter knows the channel conditions that are being experienced by the receivers that it is serving, it may schedule those users that are experiencing favourable channel conditions in preference to those experiencing unfavourable channel conditions. Furthermore, the scheduler may wish to use less error correcting coding or transmit using a higher order modulation when transmitting to users with the best channel conditions (such techniques will increase the instantaneous throughput to those users).

In the HSDPA system that is specified by 3GPP, the transmitter is the Node B and the receiver is the UE. The HSDPA system that is specified by 3GPP exploits multiuser diversity in several ways:

- the amount of error correcting coding and modulation applied may be varied between transmissions (adaptive modulation and coding: AMC).
- the scheduling function is located in the Node B: this network element has a shorter round trip delay to the UE than the RNC which is where the scheduling function is classically located. The Node B may attempt to always choose users to schedule that are experiencing favourable channel conditions.
- the UE reports channel quality directly to the Node B, allowing the Node B to make scheduling decisions based on channel quality.

Figure 2:
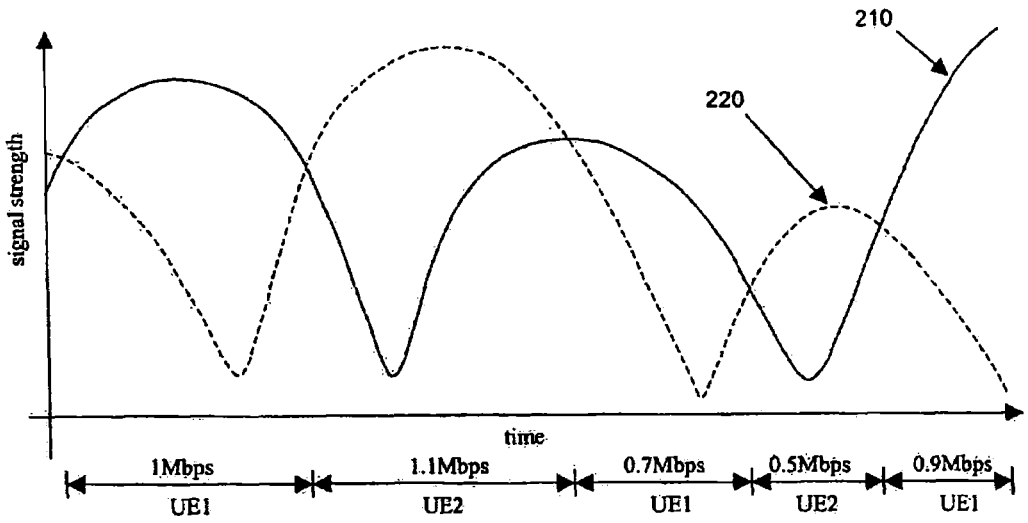
FIG. 2 shows a graph illustrating operation and multi-user diversity and adaptive modulation and coding.

The principle of operation of multi-user diversity and adaptive modulation and coding are shown in FIG. 2. In this figure, the following are shown: the signal strengths 210 and 220 at two UEs (UE1 and UE2) respectively, the Node B choice of which UE to serve and the effective data rate that the Node B is able to serve the chosen UE with (it will be noted that the Node B varies this data rate by varying the modulation and coding to the UE).

It will be noted that in general there will be many UEs that the Node B may potentially service and the Node B may schedule several of these many UEs at anyone time instant. However, the principle of operation will remain: the Node B will attempt to service those UEs with the most favourable channel conditions and will attempt to service UEs with the greatest possible data rate.

3GPP have specified HSDPA both for the FDD and for the TDD mode. In both modes of operation, there is a mechanism by which channel quality estimates are fed back from the UE to the Node B.

In FDD, a dedicated channel exists that runs continuously in the uplink and the downlink. The UE makes measurements on the downlink channel and reports these measurements continuously in the uplink (where the reporting period is specified by the network). This system has the advantage that the Node B is continuously updated with channel quality information from the UE. The disadvantage with this system is that these dedicated channels need to be maintained: these dedicated channels consume scarce power and code resources.

In TDD, there is no requirement for a dedicated channel (in the sense that any dedicated channel that is maintained by the network serves no purpose in the functioning of HSDPA and may be configured to consume an insignificant amount of physical resources in any case). When data-bearing resources (HS-DSCH) are allocated in TDD HSDPA, a shared uplink channel (HS-SICH) is automatically allocated. This uplink channel carries an acknowledgement of the HS-DSCH and a channel quality indication. The advantage of this system is that a resource-consuming dedicated channel does not need to be maintained. The disadvantage is that channel quality information is received by the scheduler in the Node B only infrequently.

The TDD method of channel quality information reporting can work well with certain traffic models and allocation strategies. Namely, when a streaming traffic model is used, each UE will be continually allocated with a resource (and the Node B will continually receive channel quality reports). However, it should be noted that a streaming traffic model is not ideally suited to exploitation of multi-user diversity (since a minimum "drip-feed" of allocation is required in order to maintain the stream).

A strategy that could be adopted by the Node B to gain channel quality information is for the Node B to explicitly request a channel quality report from the UE. This channel quality request message may be small and thus have an insignificant impact on overall system throughput. The Node B may use the returned channel quality reports to gain multi-user diversity benefits by employing adaptive modulation and coding, fast scheduling and other techniques previously referred to.

Figure 3:
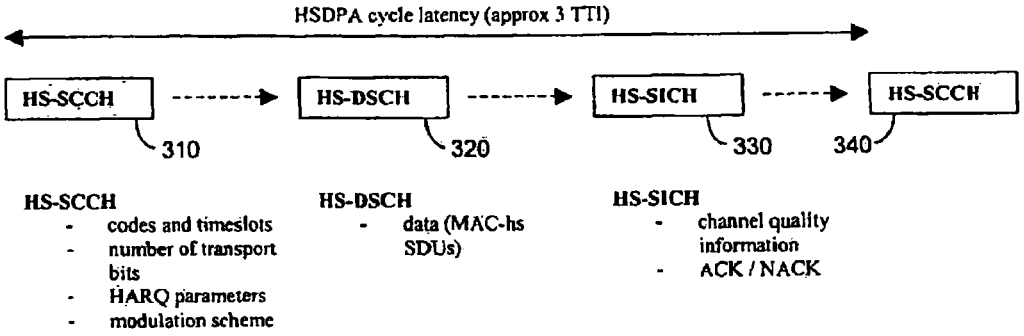
FIG. 3 shows a block schematic diagram of the HSDPA cycle.

The TDD HSDPA cycle is illustrated in FIG. 3. This figure shows the relationship between the channels that are used in the TDD HSDPA cycle: HS-SCCH (High Speed Shared Control Channel), HS-DSCH (High Speed Downlink Shared Channel) and HS-SICH (High Speed Shared Information Channel). The Node B transmits an HS-SCCH packet 310 containing allocation information such as number of codes and timeslots, modulation scheme, HARQ process ID etc. The Node B subsequently transmits an HS-DSCH packet 320 consisting of one or more physical channels; these physical channels carry user data in the form of higher layer, or MAC-hs (Medium Access Control for HS-DSCH), SDUs (Service Data Units). The UE responds to the HS-DSCH transmission with an HS-SICH packet 330. The HS-SICH carries an indication of the success, or otherwise, of the HS-DSCH transmission and a channel quality report. The Node B uses the information returned in the HS-SICH for the purposes of scheduling for the following HSDPA cycle beginning with a subsequent HS-SCCH packet 340.

An HSDPA UE contains memory for the implementation of hybrid ARQ (where retransmissions are combined with initial transmissions). This memory is commonly referred to as HARQ buffer memory. The total amount of memory that is implemented by the UE is signalled by the UE to the network as a UE capability. The network can signal the UE to partition this memory between a number of hybrid ARQ processes. The network may wish to partition this memory to allow pipelining of data transmissions to the UE (the implementation of multiple HARQ processes is a well known technique in HSDPA to those skilled in the art). The memory may be partitioned into equal or unequal amounts. The Node B signals to the UE whether data should be added into this memory or whether data should overwrite this memory. Data is normally added into the memory when there is a retransmission. Data normally overwrites this memory when either a data block is correctly received or the Node B aborts a transmission (for example, if a maximum number of attempts at sending a data block has been reached or exceeded).

Figure 4:
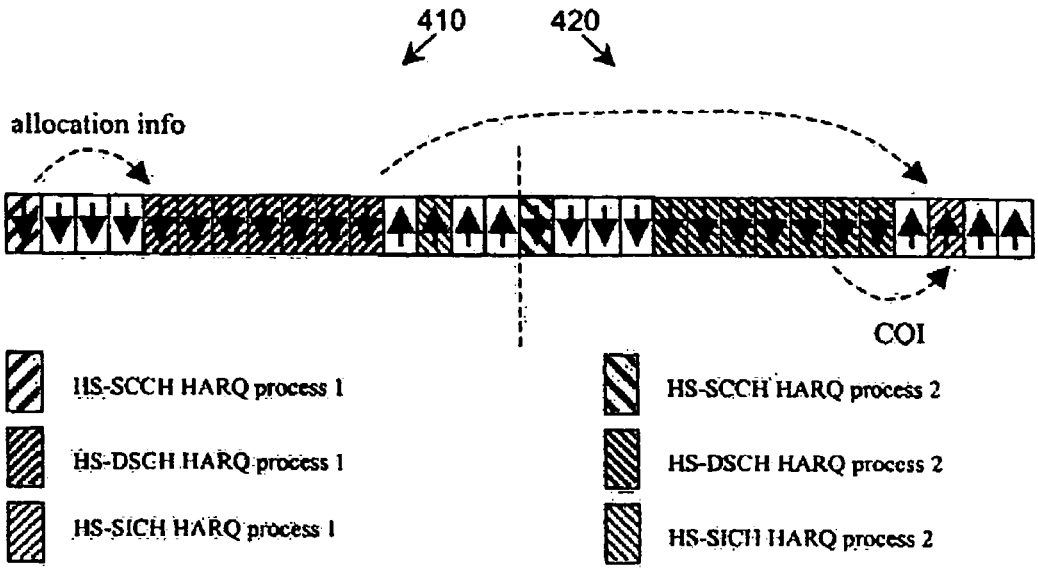
FIG. 4 shows a block schematic diagram of HSDPA operation in the time domain with 2 HARQ (Hybrid Automatic Re-transmission reQuest) processes.

FIG. 4 shows pipelined operation using 2 HARQ processes in the time domain in the case where the Node B schedules the UE in consecutive frames. Two transmission frames 410 and 420 are shown in this figure, but it will be understood that HSDPA operation is continuous and frames will be transmitted both before and after the frames illustrated in this figure. As shown in this figure, the Node B sends allocation information to the UE in the HS-SCCH. An HS-DSCH is subsequently sent to the UE. An ACK/NACK (ACKnowledge/No ACKnowledge) report is sent in the HS-SICH report related to the aforementioned HS-SCCH. The channel quality information (CQI) transmitted in the HSSICH is based on the HS-DSCH resource that occurred just prior to the HS-SICH. The detailed timing and rules relating HS-SCCH, HS-DSCH and HS-SICH will be understood by those skilled in the art. It is to be noted that this figure shows "classical" HSDPA operation where UE HARQ buffer memory is partitioned equally into several HARQ processes (in this case two) and these HARQ processes are used for transmission of user data.

Figure 5:
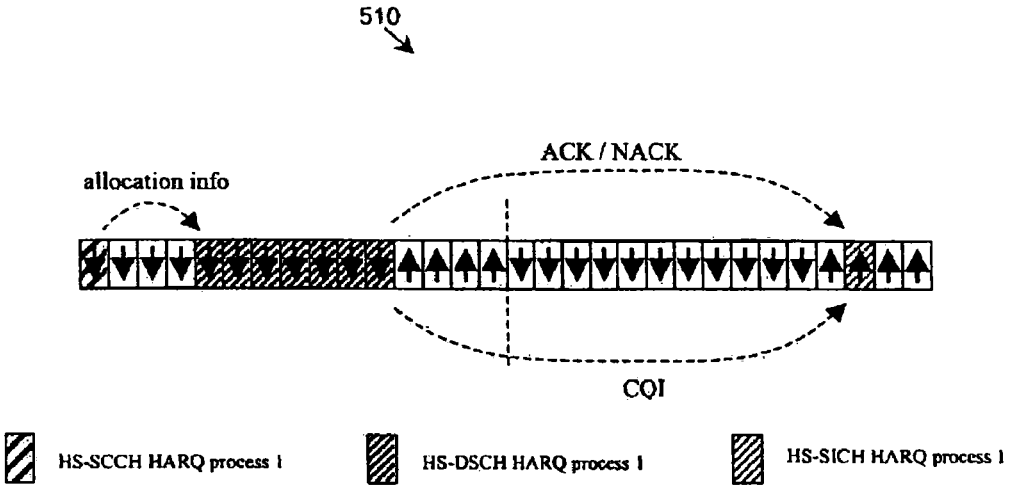
FIG. 5 shows a block schematic diagram of HSDPA operation where data is not transmitted in consecutive frames.

FIG. 5 shows HSDPA operation when there is not data to be transmitted in consecutive frames. A single HARQ process 510 is shown in this figure. It should be noted that in the case that there are not consecutive HS-DSCH allocations and when there are two HARQ processes active, the channel quality information returned in the HS-SICH packet relates to an earlier HS-DSCH than that shown in FIG. 4. The timing relationships between HS-SCCH, HS-DSCH and HS-SICH will be well understood by those skilled in the art.

Figure 6:
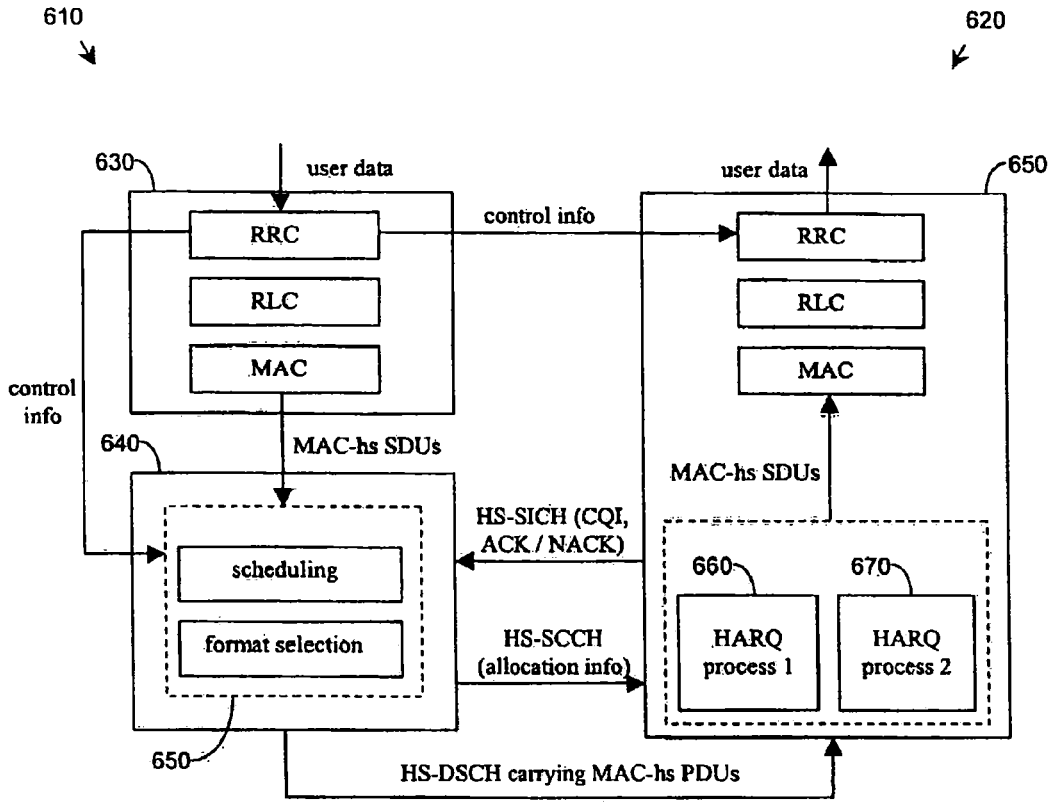
FIG. 6 shows a block schematic diagram of higher level architectural operation of HSDPA.

FIG. 6 shows the higher level architectural operation of HSDPA. This figure shows the network side and UE side entities (610 and 620 respectively). The network consists of an RNC 630 and a Node B 640. The RNC 630 has Radio Resource Control (RRC), Radio Link Control (RLC) and Medium Access Control (MAC) layers. The RNC 630 and Node B 640 are connected by an interface. The RNC 630 controls operation of the Node B 640 and UE 620 with control information. Control information is sent to the Node B 630 using the known 'Node B application part' (NBAP) protocol. Control information is sent to the UE using the known 'Radio Resource Control' (RRC) protocol. The RNC 630 sends MAC-hs SDDs to the Node B 640. The MAChs 650 in the Node B receives MAC-hs SDDs, schedules UEs, chooses modulation and coding for HS-DSCH and transmits MAC-hs PDDs (protocol data units) to the UE 620 via the HS-DSCH. The Node B 640 also transmits allocation information to the UE 620 with the HS-SCCH (shared control channel for HS-DSCH) and receives channel quality information and success/failure (ACK/NACK) reports from the UE on the HS-SICH (shared information channel for HS-DSCH). The UE receives HS-DSCH transmissions in the HARQ process (660 or 670) that was specified by the HS-SCCH. The received data is transmitted as a set of MAC-hs SDUs to higher layers in the UE: Medium Access Control (MAC), Radio Link Control (RLC) and Radio Resource Control (RRC). Following higher layer processing, the user data in the MAC-hs SDUs is sent to an application that may either be internal or external to the UE. Note that in general, the user data referred to above may consist of application data, upper layer control data or other data.

Methods for explicitly requesting channel quality information reports from the UE have been previously proposed. However, these previously proposed methods of requesting channel quality information require amendments to the 3GPP standards and do not propose how these channel quality information requests would be scheduled by the Node B or how the UE would derive the channel quality information that is to be returned to the UE.

As will be explained in further detail below, some embodiments of the present invention may provide a scheme whereby channel quality information requests may be made by the Node B scheduler in a standards compliant manner and may provide procedures that the Node B scheduler can use to schedule these channel quality information requests. In this scheme the Node B scheduler implements requests for channel quality information from the UE by transmission of an allocation message that signals an amount of physical resource and subsequent transmission of that physical resource; zero information bits are transmitted on the physical resource. There are various methods of implementing this functionality within the scope of the invention and some of these are described below as methods 1, 2, 3, 4 and 5 regarding partitioning of the UE HARQ buffer memory, signalling of the allocation message and transmission of zero information bits. Common aspects are described initially. Subsequently, the unique aspects of methods 1, 2, 3, 4 and 5 are described.

Aspects of embodiments of the invention relating specifically to scheduling are described in the Scheduling Aspects section below.

Common Aspects

Figure 7:
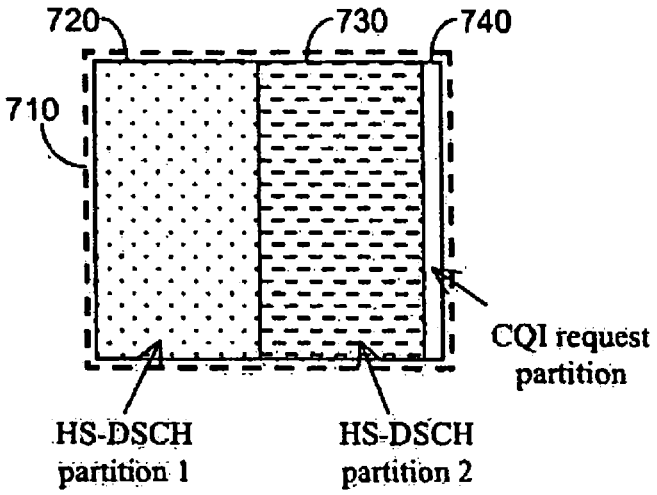
FIG. 7 shows a block schematic diagram illustrating HARQ buffer memory partitioning in accordance with an embodiment of the present invention.
Figure 8:
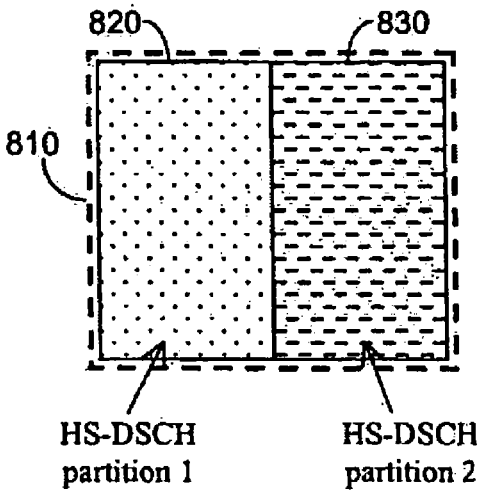
FIG. 8 Prior Art
FIG. 8 shows a block schematic diagram illustrating prior art HARQ buffer memory partitioning.

Referring now to FIG. 7, in the embodiment the network partitions the UE HARQ buffer memory 710 into a set of partitions 720 and 730 for transmission of user data and a partition 740 for channel quality information requests. This contrasts with the prior art scheme, shown in FIG. 8, in which UE HARQ buffer memory 810 is partitioned only between a set of partitions 820 and 830 for transmission of user data. In FIG. 7 the amount of UE buffer memory 710 that is required for CQI requests is small compared to the amount of buffer memory that is used for user data partitions 720 and 730. It will be understood that, if desired, more than one partition could be used for channel quality information requests.

In the scheme of an embodiment of the invention, when the network requires a channel quality information report, it sends a resource allocation for a traffic data message. Specifically, a Node B sends an allocation message that signals the UE to use the small HARQ buffer memory partition 740. The base station subsequently sends the traffic data message which may be an empty data block. The empty data block that is subsequently transmitted by the Node B is stored temporarily by the UE in this small partition 740. The UE responds with a channel quality information report and an ACK/NACK report on the transmitted block (indicating whether the empty data block was received correctly or not). Thus, the UE transmits a channel quality information message in response to receiving the traffic data message. In the new scheme, the Node B then aborts transmission of the data block into the small HARQ partition. The Node B uses the channel quality information report and may use the state of the ACK/NACK field for the purposes of scheduling future transmissions into the larger UE memory partitions 720 and 730.

Figure 9:
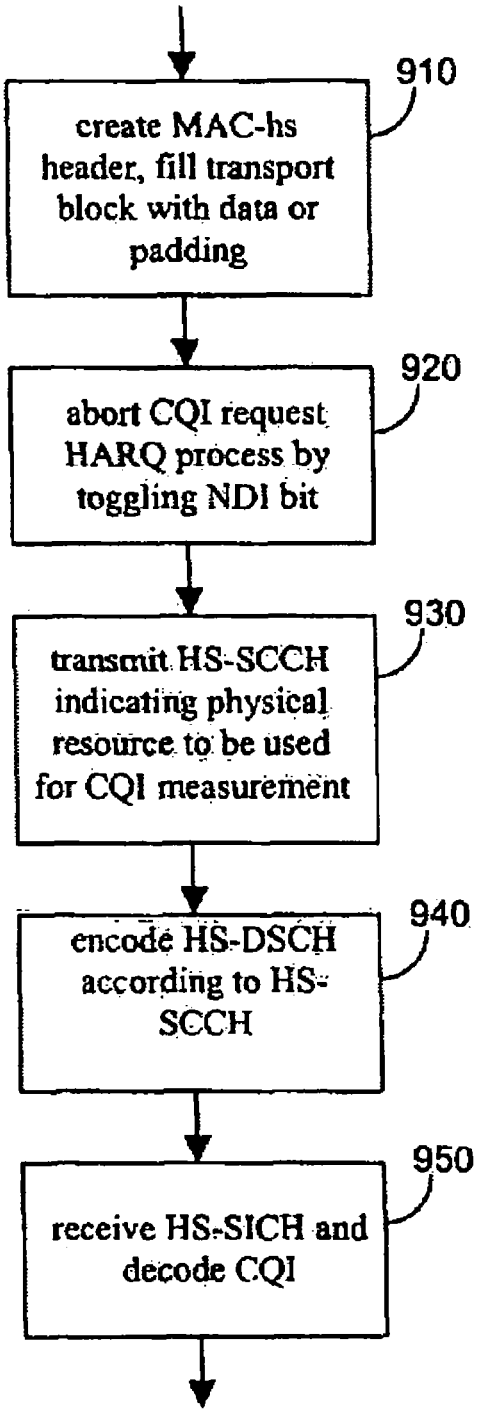
FIG. 9 shows a block schematic diagram illustrating a Node B procedure, incorporating an embodiment of the present invention, for requesting a channel quality report.

The steps undertaken by the Node B in order to request a channel quality report in accordance with an embodiment of the invention are illustrated in FIG. 9. At step 910, a MAC-hs header is created, and a transport block is filled with data or padding. At step 920, the Node B signals to the UE that the existing CQI request process (that occupies the CQI request partition described previously) is to be aborted when the UE receives the HSSCCH, by toggling the new data indicator (NDI) bit which (as will be appreciated by one of ordinary skill in this art) is transmitted in the HS-SCCH. Abortion of the existing CQI request process ensures that the CQI request that is being scheduled by the Node B overwrites the CQI request partition rather than combines into the CQI request partition. At step 930, the HS-SCCH packet is transmitted indicating the physical resource to be used for CQI measurement. At step 940, the HS-DSCH packet is encoded according to parameters transmitted in the HSS-CCH. At step 950, the HS-SICH packet is received and the CQI is decoded therefrom.

If channel conditions are poor (since the UE is in a fade), it is possible that the allocation message (transmitted on the HS-SCCH) may not be received by the UE. In this case, the UE will not respond to the Node B with a channel quality information and ACK/NACK report (on the HS-SICH channel). The Node B treats the case where an HS-SICH is not returned by the UE as an indication of poor channel quality at the UE (and may thus elect to not schedule data transmissions to the UE).

In the described embodiments, a data traffic message is transmitted on the HS-DSCH which causes the UE to transmit a CQI message. However, in accordance with the embodiments the HS-DSCH message does not have data which should be delivered to the higher layers. Thus, in contrast to the prior art, where HS-DSCH messages carry data for higher layers, the HS-DSCH message of the herein described embodiments does not cause the UE to deliver any data to the higher layers. This may be achieved in a number of different ways including methods 1 to 5 as described below. Specifically, an indication that substantially no data should be delivered to a higher layer by the UE may be transmitted to the UE. This indication may be an explicit indication or may be an implicit indication. Thus the indication may explicit data of a message indicating that no data should be delivered to a higher layer or may for example be a characteristic or feature of the HS-DSCH traffic data message and/or the HS-SCCH allocation message which directly or indirectly results in no data being delivered to higher layers from the physical layer.

In some embodiments, higher layers may be layers above the physical layer. In some embodiments, higher layers may be layers higher than the MAC layer (the layer comprising the MAC functionality). In some embodiments, higher layers may e.g. be the MAC layer and layers above the MAC layer.

Specific methods of transmitting indications that substantially no data should be delivered to a higher layer are described in the following.

Method 1

In Method 1, the allocation message (on HS-SCCH for the case of HSDPA) relates to physical resource (HS-DSCH in the case of HSDPA) that is subsequently transmitted.

The header for the data packet transmitted on the physical resource (in the case of HSDPA, the MAC-hs header in the HS-DSCH transport block) indicates that no higher layer packets are to be transmitted in the data packet (in the case of HSDPA, no MAC-hs SDUs are to be transmitted in the MAC-hs PDU). This is done in order to ensure that higher layer data packets are not forwarded to higher layers as a consequence of CQI requests. Hence, in accordance with this exemplary method, a specific an explicit indication is transmitted.

Figure 10:
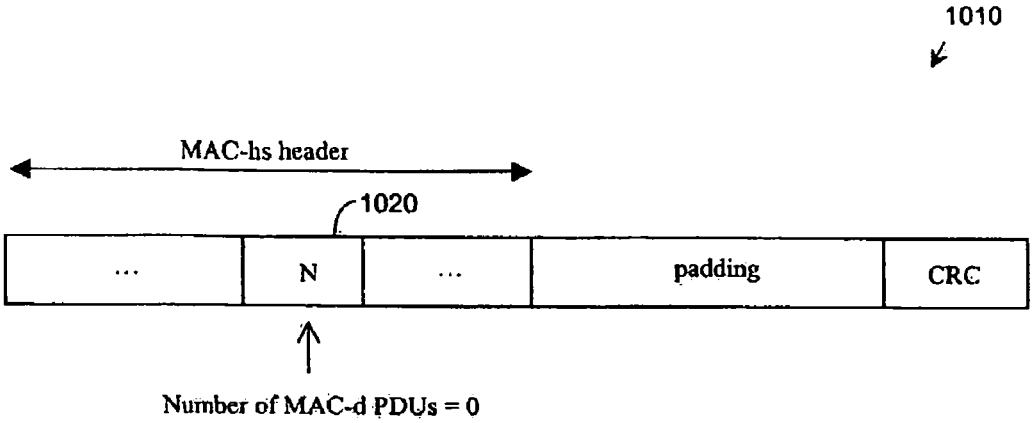
FIG. 10 shows a block schematic diagram illustrating the format of data packet that may be used in the procedure of FIG. 9.

FIG. 10 shows the format of the data packet 1010 transmitted in a Method 1 CQI request (it will be understood by those skilled in the art that this figure relates to the portion of the transmit transport channel processing chain prior to channel coding). It will be understood that fields of the data packet 1010 are those normally used in 3GPP HSDPA; however, in the presently described embodiment of the invention it should be noted that the N field (the number of MAC-d PDUs) 1020 indicates '0'. This is included in the MAC-hs header.

Method 2

In Method 2, the allocation message (on HS-SCCH for the case of HSDPA) relates to physical resource (HS-DSCH in the case of HSDPA) that is subsequently transmitted. In contrast to Method 1, in Method 2 an incorrect CRC is always transmitted. The data packet may either contain data or padding: in either case, the incorrect CRC will ensure that any data packets that are transmitted are not forwarded to higher layers. An incorrect CRC may be ensured by addition of a constant to the correct CRC or by a multiplicity of other means that are well understood by those skilled in the art. Hence, in accordance with this exemplary embodiment, incorrect verification data is transmitted. This causes an error condition in the physical layer of the UE which results in data of the data packet not being fed to a higher layer.

Method 3

In Method 3, the allocation message (on HS-SCCH for the case of HSDPA) relates to physical resource (HS-DSCH in the case of HSDPA) that is subsequently transmitted. In contrast to Method 1 and Method 2, the coding rate that is applied on the physical resource (HS-DSCH in the case of HSDPA) is greater than unity. This coding rate is signalled either implicitly or explicitly by the allocation message (in HSDPA, the coding rate is implicitly signalled by the transport block size, amount of physical resource and modulation that are signalled on the HS-SCCH). Either padding or valid data may be transmitted on the physical resource (in either case, the payload of the physical resource will never be sent up to higher layers since a coding rate of greater than unity always leads to a CRC decoding error at the receiver [even if the CRC is not corrupted at the transmitter as per method 2]).

Method 4

In Method 4, the allocation message (on HS-SCCH for the case of HSDPA) relates to physical resource (HS-DSCH in the case of HSDPA) that is subsequently transmitted. In contrast to Methods 1, 2 and 3, the allocation message signals a memory partition with an identifier that is greater than the maximum configured by the network. In this method, the network does not utilize a small memory partition as per methods 1, 2 and 3 and described in the "common aspects", however the procedure of FIG. 9 is implemented. In this case, the UE will not store the received HS-DSCH signals within its HARQ buffer memory (however a channel quality indication and ACK/NACK report will still be generated by the UE).

Method 5

In Method 5, the allocation message (on HS-SCCH for the case of HSDPA) relates to physical resource (HS-DSCH in the case of HSDPA) that is subsequently transmitted. In contrast to Methods 1, 2, 3 and 4, the HS-SCCH explicitly signals a CQI request message. Such signaling can be achieved by the use of a previously unused (not previously assigned, i.e., standardized by 3GPP) HS-SCCH message. An example coding of "CQI request" in the HSSCCH message is to code the "transport block size" in the HS-SCCH message as NULL (the 'all zero' codeword). When the UE receives an HS-SCCH with a transport block size of NULL, it will respond with a channel quality indication in an HS-SICH. The channel quality indication is based on the HS-DSCH resource signalled on the HS-SCCH. Alternatively, the channel quality report may be based on the HS-SCCH or the beacon function. The resource to which the channel quality indication relates will be known a priori between the Node B and the UE.

It will be understood that the Methods 1, 2, 3, 4 and 5 may be combined in various permutations (for instance method 1 can be combined with method 2 such that no higher layer data is transmitted on the physical resource and an incorrect CRC is carried on the physical resource).

Scheduling Aspects

There are two sets of scheduling decisions that the Node B may make in the above described embodiments. Firstly, the Node B may schedule channel quality information requests (there must be an algorithm to decide to which UEs channel quality information requests are to be sent). There may also be an algorithm to decide on which UEs to schedule based on channel quality information returned from the UEs and other information (such as amount of pending data for each UE). There are various algorithms that may be used to schedule CQI requests. Example algorithms for CQI requests are:

- round robin: the Node B prioritises UEs according to time since last CQI report (those UEs from which a CQI report has not been received recently are prioritised over those that have recently reported CQI).
- round robin for UEs with data pending: round robin CQI request scheduling is performed only for those UEs that have pending data to transmit.
- proportional fair scheduling: the Node B prioritises UEs to schedule for CQI requests based on a metric that is a function of multiple parameters. As an example, a proportional fair metric can be derived based on time since last CQI request, amount of data pending and result of previous CQI request.
- channel: the Node B prioritises CQI requests to UEs that experience a channel that the Node B can exploit for multi-user diversity purposes. For example, the Node B can prioritise CQI requests to UEs that are in pedestrian channels over UEs that are either in static or high speed channels (the Node B can track the fading profile of a pedestrian channel but not that of a high speed channel, thus there is more utility in the Node B gaining channel quality information from UEs in pedestrian channels).
- response to multi-user diversity techniques: the Node B prioritises CQI requests to UEs that have been shown to benefit from multi-user diversity techniques (for instance, the Node B can monitor the throughput achieved to a UE when scheduling decisions are made based on instantaneous CQI reports and when decisions are made on averaged CQI reports and those UEs that show a greater throughput when instantaneous CQI reports are used can be prioritised for CQI requests over UEs that show no throughput increase when instantaneous CQI reports are used).
- mixed: a mixture of the above CQI request scheduling algorithms (for example, UEs are prioritised for CQI requests according to a round robin with data pending algorithm; UEs in pedestrian channels are prioritised over UEs in non-fading or high speed channels).

The Node B may use the channel quality information solely to decide on when to schedule certain UEs in preference to other UEs. In this case, the Node B may make a conservative allocation to the UE when transmitting user data (to ensure that the user data is correctly received). Subsequent allocations based on CQI indications on user data may be more aggressive. The Node B may elect to adopt this strategy when the CQI requests are performed on physical resources other than the physical resources actually used to transmit the user data.

Alternatively, the UE may use the channel quality information to decide on when to schedule certain UEs and to make aggressive allocations to those UEs. The Node B may elect to adopt this strategy when either the CQI request is performed on physical resources that are used for transmission of user data or when the Node B believes that the interference on each physical resource is not correlated to the timeslot or code of that physical resource.

Figure 11:
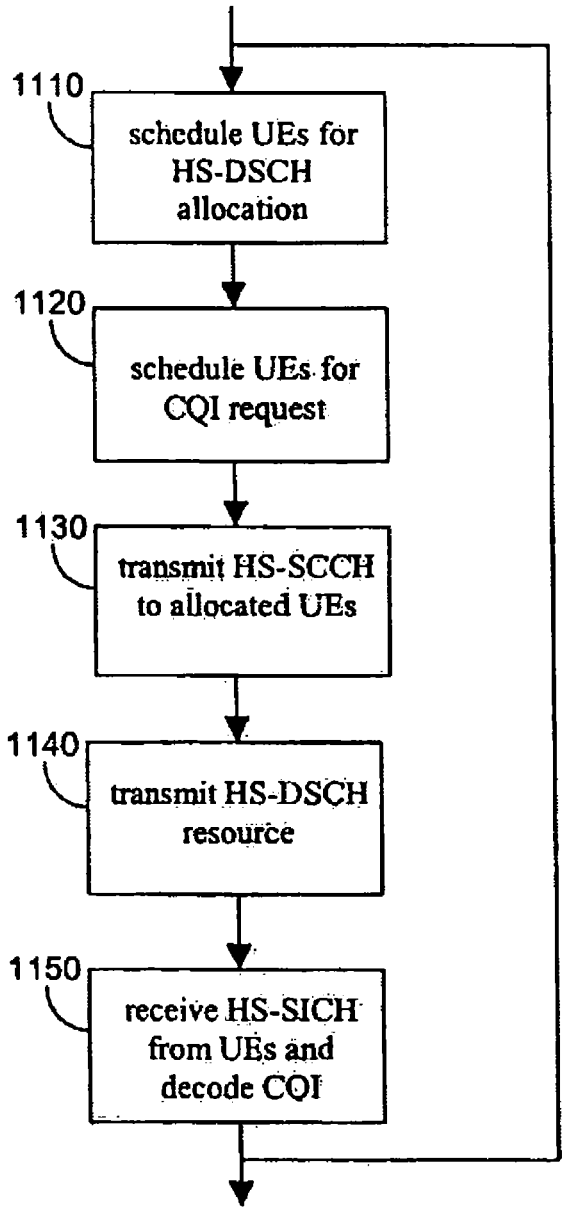
FIG. 11 shows a block schematic diagram illustrating a Node B sequence of actions that may be performed as a superset of the procedure of FIG. 9, with prior scheduling functions being additionally performed.

The sequence of steps that the Node B may take when scheduling UEs is shown in FIG. 11. At step 1110, the Node B first schedules UEs that are to carry user data (this scheduling may be based on earlier CQI reports from the UE received by the Node B). At step 1120, the Node B then schedules other UEs with CQI requests. At step 1130, based on scheduling decisions, the Node B transmits the allocation information to each allocated UE via the HS~SCCH channels. At step 1140, the Node B subsequently transmits HS-DSCH resources to the UEs as signalled in the HS-SCCH channels. These HS-DSCH resources either carry headers and user data or headers and padding (according to which of methods 1, 2, 3, 4 and 5 are employed by the Node B). The UE responds to the Node B with a channel quality indication and an ACK/NACK result on the HS-SICH channel, and at step 1150 the Node B receives the HS-SICH and decodes the channel quality information and ACK/NACK field. The Node B subsequently uses the channel quality information for subsequent scheduling decisions (i.e. the process continues at the top of the figure).

Embodiments

In practice an embodiment of the invention may be based on a 3G (3$^{rd}$ Generation) TDD Node B. This Node B forms part of a 3G cellular network and services multiple UEs. The Node B transmits and receives signals from one or several antennas to which it is attached. The Node B is positioned at a cell site.

The Node B implements the TDD HSDPA feature as specified by 3GPP. The Node B schedules UEs in priority order according to a proportional fair scheduling algorithm. The proportional fair scheduling metric is a function of the amount of data pending for transmission to that UE, a list of times that the UE has been scheduled at previously and the channel quality at the UE.

The Node B gains channel quality information on the HSSICH channel. Channel quality information is thus returned to the Node B either as a consequence of allocation of user-data bearing HS-DSCH resources or as a consequence of the Node B sending a CQI request to the UE.

The Node B partitions the UE HARQ buffer memory to provide large partitions for HARQ processes that shall receive transmissions containing user data and a small partition for HARQ processes that are to be used for CQI requests functionality.

The Node B sends CQI requests to UEs by sending an HSSCCH indicating that no higher layer transport blocks are to be transmitted to the UE in the HS-DSCH and indicating that the small HARQ buffer memory partition is to be used. Each time that the Node B sends a channel quality request to a UE on the small HARQ buffer memory partition, it toggles the state of the new data indicator bit for that UE (a new data indicator bit is maintained for each HARQ process for each UE). This new data indicator bit is toggled in order to abort previous CQI requests.

The Node B forms a MAC-hs PDD consisting of a MAC-hs header and padding. This MAC-hs PDU is transmitted on the HS-DSCH physical resources that were indicated in the previous HS-SCCH. The Node B ensures an incorrect CRC on the HS-DSCH by firstly forming the correct CRC and then inverting the logical sense of each CRC bit on the HS-DSCH. The inverted CRC is transmitted as opposed to the correct CRC.

If the Node B does not receive an HS-SICH in response to the HS-SCCH/HS-DSCH pair, it notes that the channel quality for that UE is poor. If the Node B receives an HS-SICH, it stores the channel quality report from that UE for the purposes of future scheduling.

The Node B schedules CQI requests to UEs that are in low speed channels. UEs are scheduled for CQI requests in a round robin fashion. Only those UEs with pending data for transmission and in low speed channels are scheduled for CQI requests.

The Node B schedules user data transmissions on HS-DSCH to UEs on the basis of channel quality information reports that are returned on HS-SICH. The Node Buses both channel quality information reports that are associated with user data on HS-DSCH and channel quality information reports that are associated with CQI requests.

It will be understood that the scheme for HSDPA scheduling in a communication system described above may provide the following advantages singly or in any combination:

The base station is able to effectively exploit multi-user diversity by scheduling users experiencing good channel conditions in preference to users with inferior channel conditions.

The base station is able to make optimal choices of modulation and channel coding rate to apply to each UE based on recent channel quality reports.

Cell throughput (the number of information bits that are transmitted per second) is increased in heavily loaded situations.

Packet call throughput (the ratio of number of bits transmitted to a UE in a packet call and the time taken to transmit those bits) is increased when the base station serves a given number of UEs.

The number of UEs that can be supported at a given packet call throughput is increased.

The specific advantages of methods 1, 2, 3, 4 and 5 are:

Method 1 has the advantage that the UE may use the state of the CRC (correct or incorrect) in order to adjust the value of the CQI report that it generates as a function of the block error rate.

Method 2 has the advantage that contents of MAC-hs PDDs are not delivered to the main MAC entity in the UE. This reduces the computational overhead in the UE and ensures that complications do not arise due to UEs that do not correctly handle reception of MAC-hs PDDs that carry zero MAC-hs SDDs.

Method 3 has the advantage that contents of MAC-hs PDDs are not delivered to the main MAC entity in the UE (as per method 2) and that any closed-loop system in the UE for mapping CQI report to block error rate is not corrupted.

Method 4 has the advantage that all of the memory implemented in the UE is available for reception and decoding of user data.

Method 5 has the advantage that the CQI request is explicit, but has the disadvantage that it is not backwards compatible with earlier generation UEs.

Methods 1, 2, 3 and 4 can be implemented solely in the base station and do not require changes to the mobile equipment. This allows base stations to be upgraded with the CQI request functionality without an operator having to upgrade mobile equipment previously deployed in the field.

It will be appreciated that the scheme for HSDPA communication described above may be carried out in software running on processors (not shown) in a Node B and UE, and that the software may be provided as computer program elements carried on any suitable data carriers (also not shown) such as magnetic or optical computer discs.

It will be also be appreciated that the scheme for HSDPA communication described above may alternatively be carried out in hardware, for example in the form of integrated circuits (not shown) such as FPGAs (Field Programmable Gate Arrays) or ASICs (Application Specific Integrated Circuits) in the Node B and UE.

It will further be understood that although the preferred embodiments have been described above in the context of a 3GPP UTRA TDD wireless system, the invention is not limited to this application and may be used in any suitable communication system including any communication system employing HSDPA.

Although the present invention has been described in connection with specific embodiments, it is not intended to be limited to the specific form set forth herein. Rather, the scope of the present invention is limited only by the accompanying claims. In the claims, the term comprising does not exclude the presence of other elements or steps. Furthermore, although individually listed, a plurality of means, elements or method steps may be implemented by e.g. a single unit or processor.

Additionally, although a feature may appear to be described in connection with a particular embodiment, one skilled in the art would recognize that various features of the described embodiments may be combined in accordance with the invention. It follows that although individual features may be included in different claims, these may possibly be advantageously combined, and the inclusion in different claims does not imply that a combination of features is not feasible and/or advantageous. Specifically, features included in dependent claims to one independent claim may also be combined with features of another independent claim. Also, features of dependent claims to an independent claim of a first claim category may also be combined with features and independent claims of a different claim category. In addition, singular references do not exclude a plurality. Thus references to "a", "an", "first", "second" etc do not preclude a plurality.

What is claimed is:

[1. A method for HSDPA communication between a base station and a plurality of remote stations in a communication system, the method comprising, at the base station:

transmitting a first message for allocating a resource to the plurality of remote stations in order to receive channel quality information therefrom, wherein at least one remote station of the plurality of remote stations includes a hybrid automatic retransmission request buffer memory partitioned into a plurality of blocks of which at least one is used to generate the channel quality information;

transmitting a second message for the allocated resource, the second message containing substantially no data that is to be delivered to communication layers higher than a physical layer; and using the received channel quality information, the channel quality information based on the transmission of the second message, to control the HSDPA communication.]

[2. The method of claim 1 wherein using the received channel quality information to control the FISDPA communication comprises at least one of a-c:

a. scheduling the HSDPA communication with the plurality of remote stations, b. determining channel coding for the HSDPA communication with the plurality of remote stations, c. determining modulation to be applied to the HSDPA communication with the plurality of remote stations.]

[3. The method of claim 1 wherein transmitting a first message for allocating a resource comprises transmitting a data packet to the remote stations, and wherein the data packet contains no higher layer packets.]

[4. The method of claim 3 wherein the data packet is a high speed downlink shared channel packet.]

[5. The method of claim 1 wherein transmitting the first message for allocating a resource comprises transmitting a data packet to the remote stations, and wherein the data packet includes an incorrect cyclic redundancy check.]

[6. The method of claim 1 wherein transmitting the first message for allocating a resource comprises transmitting a data packet to the remote stations, and wherein the coding rate of the data packet is greater than unity.]

[7. The method of claim 1 wherein transmitting the first message for allocating a resource comprises an invalid hybrid automatic retransmission request process in an allocation message to the remote stations.]

[8. The method of claim 1 wherein the channel quality information is a response message comprising a high speed shared information channel packet.]

[9. The method of claim 1 further comprising aborting transmissions to the channel quality information message partition.]

[10. The method of claim 1 further comprising determining poor channel quality if there is no response from a remote station after transmitting the second message.]

[11. The method of claim 1 wherein the first message to allocate a resource to a remote stations is scheduled in order to receive channel quality information therefrom. ]

[12. The method of claim 11 wherein the first message is scheduled in a round robin fashion.]

[13. The method of claim 12 wherein the first message is scheduled in a round robin fashion only when the base station has pending data to be transmitted to those remote stations. ]

[14. The method of claim 11 wherein the first message is scheduled using a proportional fair scheduling metric that consists of a function of at least one of d-f:

d. time since last channel quality indication request, e. amount of pending data, f. result of previous channel quality indication request.]

[15. The method of claim 11 wherein the first message is scheduled based on known channel type at the remote stations.]

[16. The method of claim 11 wherein the first message is scheduled based on priority to those remote stations that show an increased throughput when instantaneous channel quality reports are followed.]

[17. The method of claim 1 wherein allocating a resource includes transmitting an allocation message in the form of a channel quality indication request that has not previously been standardized.]

[18. The method of claim 17 wherein the allocation message contains a NULL transport block size.]

[19. The method of claim 18 wherein the channel quality indication is a signal to noise ratio measurement.]

[20. The method of claim 18 wherein the channel quality indication comprises at least one of transport block size and modulation.]

[21. The method of claim 20 wherein the channel quality indication comprises at least one of transport block size and modulation that could be supported on the physical resources signaled in the allocation message.]

[22. The method of claim 17 wherein the channel quality indication is based on physical resources signaled in the allocation message.]

[23. The method of claim 17 wherein the channel quality indication is based on channel quality experienced on the physical resources carrying the allocation message.]

[24. The method of claim 17 wherein the channel quality indication is based on a broadcast signal.]

[25. The method of claim 17 wherein the channel quality indication is based on a beacon signal.]

[26. The method of claim 1 wherein the system comprises a 3GPP UMTS system. ]

[27. The method of claim 26 wherein the 3GPP UMTS system comprises a TDD system.]

[28. A computer-readable storage medium encoded with program code for performing the method of claim 1.]

[29. The computer-readable storage medium encoded with program code of claim 28 wherein using the received channel quality information to control the HSDPA communication of the method comprises at least one of a-c:

a. scheduling the HSUPA communication with the plurality of remote stations, b. determining channel coding for the HSDPA communication with the plurality of remote stations, c. determining modulation to be applied to the HSDPA communication with the plurality of remote stations.]

[30. The computer-readable storage medium encoded with program code of claim 28 wherein allocating a resource of the method comprises the base station transmitting to the remote stations a data packet, wherein the base station signals to the remote stations that the data packet contains no higher layer packets.]

[31. The computer-readable storage medium encoded with program code of claim 28 wherein allocating a resource of the method comprises the base station transmitting to the remote stations a data packet, and wherein the data packet includes an incorrect cyclic redundancy check.]

[32. The computer-readable storage medium encoded with program code of claim 28 wherein allocating a resource of the method comprises the base station transmitting to the remote stations a data packet, and the coding rate of the data packet is greater than unity.]

[33. The computer-readable storage medium encoded with program code of claim 28 wherein allocating a resource of the method comprises the base station transmitting to the remote stations an invalid hybrid automatic retransmission request process in an allocation message.]

[34. The computer-readable storage medium encoded with program code of claim 28 wherein allocating a resource of the method comprises the base station transmitting to the remote stations an allocation message which explicitly signals a channel quality indication request.]

[35. A base station for HSDPA communication with a plurality of remote stations in a communication system, the base station comprising:

means for transmitting a first message to the plurality of remote stations for allocating a resource in order to receive channel quality information therefrom, wherein at least one remote station of the plurality of remote stations includes a hybrid automatic retransmission request buffer memory partitioned into a plurality of blocks of which one supports generation of the channel quality information;

means for transmitting a second message for the allocated resource, the second message containing substantially no data that is to be delivered to communication layers higher than a physical layer;

means for receiving channel quality information from the remote stations, the channel quality information based on the transmission of the second message; and means for using the received channel quality information to control the HSDPA communication.]

[36. The remote station of claim 35 further comprising means for aborting transmissions to the partitioned block which supports the channel quality information.]

[37. A method of determining channel propagation information associated with a communication service including a base station and a plurality of remote stations in a cellular communication system, the method comprising:

transmitting a resource allocation for a traffic data message from a base station to a remote station, the traffic data message being operable to cause a channel quality information message to be transmitted from the remote station, wherein the remote station includes a hybrid automatic retransmission request buffer memory partitioned into a plurality of blocks of which one supports generation of the channel quality information;

transmitting the traffic data message to the remote station;

receiving the channel quality information message from the remote station; and transmitting an indication that substantially no data should be delivered to a layer higher than a physical layer by the remote station in response to receiving the traffic data message.]

[38. The method claimed in claim 37 wherein transmitting the traffic data message uses a retransmission request process; and the method further comprises aborting the transmission of the traffic data message.]

[39. The method claimed in claim 37 wherein the resource allocation comprises the indication.]

[40. The method claimed in claim 37 wherein the communication service is an HSDPA communication service.]

[41. The method claimed in claim 40 wherein the traffic data message is a high speed downlink shared channel packet traffic data message.]

[42. The method claimed in claim 40 wherein the traffic data message is an HSDPA resource allocation message.]

[43. The method claimed in claim 37 wherein the resource allocation message comprises indication data indicating that no data should be delivered to the higher layer.]

[44. The method chimed in claim 43 wherein the resource allocation message comprises an indication of an invalid retransmission request process.]

[45. The method claimed in claim 37 wherein the traffic data message comprises the indication.]

[46. The method claimed in claim 45 wherein the indication is a characteristic of the traffic data message which causes an error condition in the physical layer of the UE.]

[47. The method claimed in claim 45 wherein the indication comprises incorrect verification data.]

[48. The method claimed in claim 45 wherein the indication comprises a coding rate of the traffic data message higher than unity.]

[49. The method claimed in claim 37 further comprising scheduling a resource in response to the channel quality information.]

[50. The method of claim 37 wherein the system comprises a 3GPP UMTS system.]

[51. The method of claim 50 wherein the 3GPP UMTS system comprises a TDD system.]

[52. An apparatus for determining channel propagation information associated with a communication service in a cellular communication system, the apparatus comprising:

an allocation controller for generating a resource allocation for a traffic data message;

a traffic controller for generating the traffic data message being operable to cause a channel quality information message to be transmitted from a remote station;

a transmitter for transmitting the resource allocation and the traffic data message from a base station to a plurality of remote stations, wherein at least one remote station of the plurality of remote stations includes a hybrid automatic retransmission request buffer memory partitioned into a plurality of blocks of which at least one is used to generate the channel quality information; and a receiver for receiving the channel quality information message from at least one remote station of the plurality of remote stations, wherein the transmitter is configured to transmit an indication that substantially no data should be delivered to a layer higher than a physical layer by the remote station in response to receiving the traffic data message.]

*53. A method of controlling wireless communication between a base station and a plurality of remote stations using received channel quality information in a cellular communication system, the method comprising, at the base station: transmitting a first message for allocating a resource to the plurality of remote stations in order to receive channel quality information therefrom, wherein at least one remote station of the plurality of remote stations includes a hybrid automatic retransmission request buffer memory partitioned into a plurality of blocks of which at least one is used to generate the channel quality information; transmitting a second message for the allocated resource, the second message containing user data that is to be delivered to communication layers higher than a physical layer; and using the received channel quality information, the channel quality information based on the transmission of the second message, to control the wireless cellular communication.*

*54. The method of claim 53 wherein using the received channel quality information to control the communication comprises at least one of a-c: a. scheduling a HSDPA communication as the wireless high speed communication with the plurality of remote stations, b. determining channel coding for the HSDPA communication with the plurality of remote stations, c. determining modulation to be applied to the HSDPA communication with the plurality of remote stations.*

*55. The method of claim 53 wherein transmitting a first message for allocating a resource comprises transmitting a data packet to the remote stations, and wherein the data packet contains no higher layer packets.*

*56. The method of claim 55 wherein the data packet is a high speed downlink shared channel packet.*

*57. The method of claim 53 wherein transmitting the first message for allocating a resource comprises transmitting a data packet to the remote stations, and wherein the data packet includes an incorrect cyclic redundancy check.*

*58. The method of claim 53 wherein transmitting the first message for allocating a resource comprises transmitting a data packet to the remote stations, and wherein the coding rate of the data packet is greater than unity.*

*59. The method of claim 53 wherein transmitting the first message for allocating a resource comprises an invalid hybrid automatic retransmission request process in an allocation message to the remote stations.*

*60. The method of claim 53 wherein the channel quality information is a response message comprising a high speed shared information channel packet.*

*61. The method of claim 53 further comprising aborting transmissions to the channel quality information message partition.*

*62. The method of claim 53 further comprising determining poor channel quality if there is no response from a remote station after transmitting the second message.*

*63. The method of claim 53 wherein the first message to allocate a resource to a remote stations is scheduled in order to receive channel quality information therefrom.*

*64. The method of claim 53 wherein the first message is scheduled in a round robin fashion.*

*65. The method of claim 64 wherein the first message is scheduled in a round robin fashion only when the base station has pending data to be transmitted to those remote stations.*

*66. The method of claim 63 wherein the first message is scheduled using a proportional fair scheduling metric that consists of a function of at least one of d-f: d. time since last channel quality indication request, e. amount of pending data, f. result of previous channel quality indication request.*

*67. The method of claim 63 wherein the first message is scheduled based on known channel type at the remote stations.*

*68. The method of claim 63 wherein the first message is scheduled based on priority to those remote stations that show an increased throughput when instantaneous channel quality reports are followed.*

*69. The method of claim 53 wherein allocating a resource includes transmitting an allocation message in the form of a channel quality indication request that has not previously been standardized.*

*70. The method of claim 69 wherein the allocation message contains a NULL transport block size.*

*71. The method of claim 70 wherein the channel quality indication is a signal to noise ratio measurement.*

*72. The method of claim 70 wherein the channel quality indication comprises at least one of transport block size and modulation.*

*73. The method of claim 72 wherein the channel quality indication comprises at least one of transport block size and modulation that could be supported on the physical resources signaled in the allocation message.*

*74. The method of claim 69 wherein the channel quality indication is based on physical resources signaled in the allocation message.*

*75. The method of claim 69 wherein the channel quality indication is based on channel quality experienced on the physical resources carrying the allocation message.*

*76. The method of claim 69 wherein the channel quality indication is based on a broadcast signal.*

*77. The method of claim 69 wherein the channel quality indication is based on a beacon signal.*

*78. The method of claim 53 wherein the system comprises a 3GPP UNITS system.*

*79. The method of claim 78 wherein the 3GPP UNITS system comprises a TDD system.*

*80. A non-transitory computer-readable storage medium encoded with program code that when executed by a processor cause the processor to perform a method of controlling wireless communication between a base station and a plurality of remote stations using received channel quality information in a cellular communication system, the method comprising at the base station:*

*transmitting a first message for allocating a resource to the plurality of remote stations in order to receive channel quality information therefrom, wherein at least one remote station of the plurality of remote stations includes a hybrid automatic retransmission request buffer memory partitioned into a plurality of blocks of which at least one is used to generate the channel quality information; transmitting a second message for the allocated resource, the second message containing user data that is to be delivered to communication layers higher than a physical layer; and using the received channel quality information, the channel quality information based on the transmission of the second message, to control the wireless cellular communication.*

*81. The computer-readable storage medium encoded with program code of claim 80 wherein using the received channel quality information to control the HSDPA communication as the high speed wireless communication of the method comprises at least one of a-c: a. scheduling the HSDPA communication with the plurality of remote stations, b. determining channel coding for the HSDPA communication with the plurality of remote stations, c. determining modulation to be applied to the HSDPA communication with the plurality of remote stations.*

*82. The computer-readable storage medium encoded with program code of claim 80 wherein allocating a resource of the method comprises the base station transmitting to the remote stations a data packet, wherein the base station signals to the remote stations that the data packet contains no higher layer packets.*

*83. The computer-readable storage medium encoded with program code of claim 80 wherein allocating a resource of the method comprises the base station transmitting to the remote stations a data packet, and wherein the data packet includes an incorrect cyclic redundancy check.*

*84. The computer-readable storage medium encoded with program code of claim 80 wherein allocating a resource of the method comprises the base station transmitting to the remote stations a data packet, and the coding rate of the data packet is greater than unity.*

*85. The computer-readable storage medium encoded with program code of claim 80 wherein allocating a resource of the method comprises the base station transmitting to the remote stations an invalid hybrid automatic retransmission request process in an allocation message.*

*86. The computer-readable storage medium encoded with program code of claim 80 wherein allocating a resource of the method comprises the base station transmitting to the*

*remote stations an allocation message which explicitly signals a channel quality indication request.*

*87. A base station for wireless cellular communication with a plurality of remote stations using received channel quality information in a cellular communication system, the base station comprising: means for transmitting a first message to the plurality of remote stations for allocating a resource in order to receive channel quality information therefrom, wherein at least one remote station of the plurality of remote stations includes a hybrid automatic retransmission request buffer memory partitioned into a plurality of blocks of which one supports generation of the channel quality information; means for transmitting a second message for the allocated resource, the second message containing user data that is to be delivered to communication layers higher than a physical layer; means for receiving channel quality information from the remote stations, the channel quality information based on the transmission of the second message; and means for controlling the wireless cellular communication based on the received channel quality information.*

*88. The remote station of claim 87 further comprising means for aborting transmissions to the partitioned block which supports the channel quality information.*

*89. A method of determining channel propagation information associated with a communication service including a base station and a plurality of remote stations in a cellular communication system, the method comprising: transmitting a resource allocation for a traffic data message from a base station to a remote station, the traffic data message being operable to cause a channel quality information message to be transmitted from the remote station, wherein the remote station includes a hybrid automatic retransmission request buffer memory partitioned into a plurality of blocks of which one supports generation of the channel quality information; transmitting the traffic data message to the remote station; receiving the channel quality information message from the remote station; and transmitting an indication that user data should be delivered to a layer higher than a physical layer by the remote station in response to receiving the traffic data message.*

*90. The method claimed in claim 89 wherein transmitting the traffic data message uses a retransmission request process; and the method further comprises aborting the transmission of the traffic data message.*

*91. The method claimed in claim 89 wherein the resource allocation comprises the indication.*

*92. The method claimed in claim 89 wherein the communication service is an HSDPA communication service.*

*93. The method claimed in claim 92 wherein the traffic data message is a high speed downlink shared channel packet traffic data message.*

*94. The method claimed in claim 92 wherein the traffic data message is an HSDPA resource allocation message.*

*95. The method claimed in claim 89 wherein the resource allocation message comprises indication data indicating that no data should be delivered to the higher layer.*

*96. The method chimed in claim 95 wherein the resource allocation message comprises an indication of an invalid retransmission request process.*

*97. The method claimed in claim 89 wherein the traffic data message comprises the indication.*

*98. The method claimed in claim 97 wherein the indication is a characteristic of the traffic data message which causes an error condition in the physical layer of the UE.*

*99. The method claimed in claim 97 wherein the indication comprises incorrect verification data.*

*100. The method claimed in claim 97 wherein the indication comprises a coding rate of the traffic data message higher than unity.*

*101. The method claimed in claim 89 further comprising scheduling a resource in response to the channel quality information.*

*102. The method of claim 89 wherein the system comprises a 3GPP UNITS system.*

*103. The method of claim 102 wherein the 3GPP UNITS system comprises a TDD system.*

* * * * *